United States Patent [19]

Iguchi

[11] Patent Number: 4,920,618
[45] Date of Patent: May 1, 1990

[54] FASTENING CLIP

[75] Inventor: Tatsuya Iguchi, Toyota, Japan

[73] Assignee: Nifco, Inc., Yokohama, Japan

[21] Appl. No.: 277,156

[22] Filed: Nov. 29, 1988

[30] Foreign Application Priority Data

Dec. 2, 1987 [JP] Japan .............................. 62-183955

[51] Int. Cl.⁵ ............................................ F16B 13/04
[52] U.S. Cl. ...................................... 24/453; 24/297;
411/38; 411/508
[58] Field of Search ............. 174/138 D; 24/453, 297,
24/326, 606, 607; 411/508–510, 34–38, 41, 43,
45, 46, 48, 107; 403/405.1, 408.1

[56] References Cited

U.S. PATENT DOCUMENTS

| | | | |
|---|---|---|---|
| 4,036,098 | 7/1977 | Schruff | 411/34 |
| 4,122,583 | 10/1978 | Grittner et al. | 24/297 X |
| 4,312,614 | 1/1982 | Palmer et al. | 24/297 X |
| 4,318,650 | 3/1982 | Llauge | 411/43 X |
| 4,502,193 | 3/1985 | Harmon et al. | 24/606 X |
| 4,752,168 | 6/1988 | Richter | 411/38 |

*Primary Examiner*—James R. Brittain
*Attorney, Agent, or Firm*—Schwartz & Weinrieb

[57] ABSTRACT

A clip for securing a first member to a second member includes a flange portion having an opening, an inserting portion, a pawl portion provided upon the inserting portion so as to be engageable with the flange portion and the second member, and a plurality of foldable coupling portions for connecting the inserting portion with the flange portion. The inserting portion is inserted through the first member in a first direction, then back downwardly into the opening of the flange portion and finally through the second member in a second direction, thereby securing the first member to the second member. When the inserting portion is inserted into the opening of the flange portion, the pawl portion engages the flange portion to retain the flange portion in engagement with the undersurface of the first member. When the inserting portion is further inserted through the second member, the pawl portion engages the second portion member so as to clamp the second member in cooperation with the flange portion. The coupling portions are folded as a result of the insertion of the inserting portion into the opening of the flange portion so as to clamp the first member in cooperation with the flange portion.

12 Claims, 1 Drawing Sheet

FASTENING CLIP

BACKGROUND OF THE INVENTION

1. Field of the Invention

This invention relates to a clip used for securing fittings such as, for example, a trim board or an insulator member of an automobile to a body panel.

2. Description of the Prior Art

In automobiles, fittings such as, for example as trim boards and insulators are mounted by means of clips.

A typical well-known clip which is used to this end has a head and a leg portion depending therefrom and a pawl portion. To secure an insulator member, for instance, to a body panel, the leg of the clip is inserted through the insulator member and the body panel, whereby the insulator member and the body panel are clamped between the head and the pawl portion of the clip. In this way, the insulator member can be mounted upon the body panel.

However, such a prior-art clip cannot be provisionally secured to the insulator member or the like. Therefore, when mounting the insulator member upon the body panel, it is necessary to have the insulator member aligned with the body panel before inserting the leg portion of the clip through the insulator member and the body panel. This means that when an insulator member or the like is mounted upon a body panel in an upright state or in a dependent state, the insulator member or the like has to be supported in a state in which it is aligned with the body panel, so that the mounting of the insulator member or a like fitting upon the body panel consumes much time and labor.

OBJECT OF THE INVENTION

The present invention has been accomplished in light of the above drawbacks, and its object is to provide a clip which is capable of being provisionally secured to an insulator or like member to be mounted upon a support panel.

SUMMARY OF THE INVENTION

In order to attain the above object of the invention, there is provided a clip for securing a first member to a second member, which comprises a flange portion having an opening defined therein, an inserting portion extending upwardly from an upper surface of the flange portion so as to be inserted through the first member in a direction extending from the undersurface side of the member to the upper surface side of the first member, and the the opening of the flange portion and the second member, a pawl portion provided upon the inserting portion and capable of engagement with the flange portion and also with the second member when the inserting member is inserted back through the opening of the flange portion, the pawl portion acting, when in engagement with the flange portion, as a retainer to retain the inserting portion and the clip mounted upon the first member and also acting, when in engagement with the second member, to clamp the second member as a result of cooperation with the flange portion, and a plurality of coupling portions foldably united to the inserting portion and also to the flange portion so as to be inserted together with the insertion portion through the first member and bent into a folded state so as to clamp the first member as a result of cooperation with the flange portion with the pawl portion in engagement with the flange portion or with the second member.

With the above construction of the clip according to the invention, by inserting the coupling portions, which initially extend in the longitudinal direction of the inserting portion, together with the inserting portion through the first member and then inserting the inserting portion back through the opening of the flange portion, the pawl portion engages with the flange portion while the coupling portions are folded outwardly so as to clamp the first member in cooperation with the flange portion. In this way, the clip is provisionally secured to the first member.

By inserting the inserting portion of the clip in this state through the second member, the pawl portion then engages the second member so as to clamp the second member in cooperation with the flange portion, so that the clip is secured to the second member. In this way, the first member is mounted upon the second member.

BRIEF DESCRIPTION OF THE DRAWINGS

The above and other objects and features of the invention will become more apparent from the following detailed description with reference to the accompanying drawings, wherein.

DETAILED DESCRIPTION OF THE PREFERRED EMBODIMENT

Figure 2:
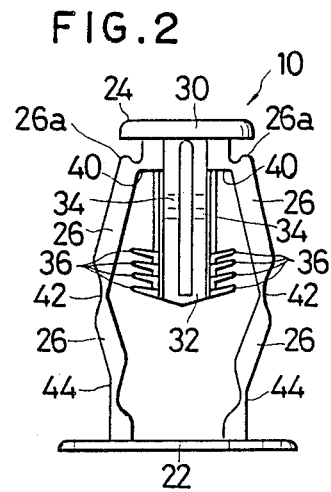
FIG. 2 is a front view showing the clip shown in FIG. 1.
Figure 3:
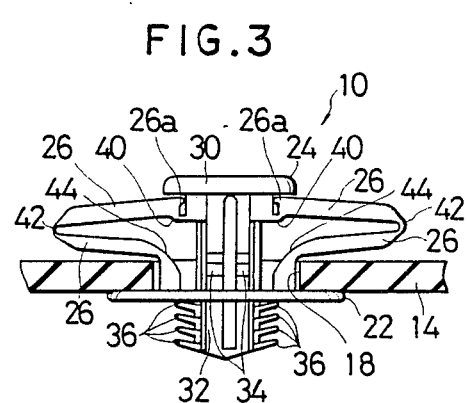
FIG. 3 is a front view showing the clip of FIG. 1 provisionally secured to an insulator member.
Figure 4:
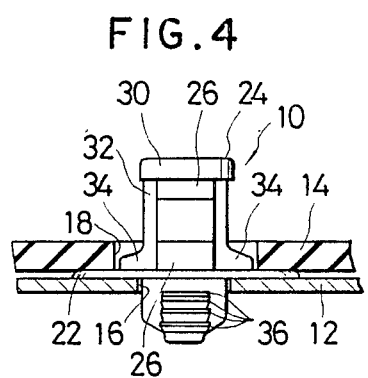
FIG. 4 is a side view showing the clip of FIG. 1 securing the insulator member to a body panel.
Figure 5:
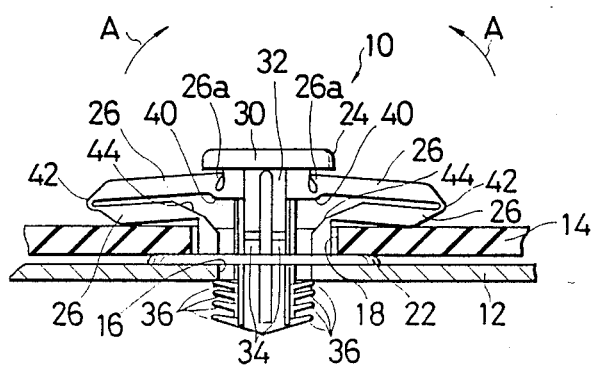
FIG. 5 is a front view showing the clip of FIG. 1 securing the insulator member to the body panel.

FIGS. 1 to 5 show an embodiment of the clip according to the invention. This embodiment of the clip 10 is used to mount an insulator member 14 upon a body panel 12, as shown in FIGS. 4 and 5. The body panel 12 and insulator member 14 are formed with respective holes 16 and 18, and the clip 10 is inserted through the holes 16 and 18 so as to secure the insulator member 14 to the body panel 12. The hole 16 has a smaller diameter than that of the hole 18.

The clip 10 has a flange portion 22, an inserting portion 24 and a plurality of arms 26 constituting coupling portions between flange portion 22 and inserting portion 24. It is fabricated as a one-piece plastic molding.

Figure 1:
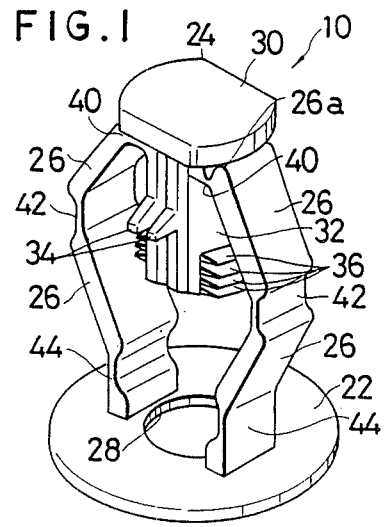
FIG. 1 is a perspective view showing a the clip according to the invention.

The flange portion 22, as shown in FIG. 1, is in the form of a thin disk and has a substantially central opening 28 defined therein. The diameter of the opening 28 is substantially equal to the diameter of the hole 16. The flange portion 22 is adapted to interposed between the insulator member 14 and the body panel 12.

The inserting portion 24 has a head 30 and a leg portion 32 depending therefrom. The leg portion 32 is adapted to be inserted upwardly through the hole 18 of the insulator member 14 such that the upper surface of flange portion 22 abuts the undersurface of insulator member 14, then back downwardly through the opening 28 of the flange portion 22 and the hole 16 of the body panel 12 so that its free end projects from the back side of the body panel 12. The head 30 is smaller in size than the diameter of the hole 18 of the insulator member 14, so that the inserting portion 24 can be inserted upwardly with the head 30 extending first through the hole 18 of the insulator member 14.

The leg portion 32 of the inserting portion 24 has its longitudinally intermediate portion provided with engagement portions 34 extending in radial directions outwardly from the longitudinal axis of the leg portion. In the embodiment shown in FIG. 1, two engagement portions 34 extend radially outwardly from each of a pair of opposite sides of the leg portion 32. When the inserting portion 24 is inserted through the opening 28 of the flange portion 22, the engagement portions 34 abut the upper surface of the flange portion 22 so as to limit the extent to which the inserting portion 24 is able to be inserted through the hole 28 of the flange portion 22.

Furthermore, the leg portion 32 of the inserting portion 24 has its free end portion provided with a plurality of pawls 36 extending radially outwardly from the leading end of the leg portion upon each of another pair of opposite sides of the leg portion. The pawls 36 are adapted to engage the back side of the body panel 12 (lower side thereof in FIGS. 4 and 5) so as to clamp the body panel 12 in cooperation with the flange portion 22. When the inserting portion 24 is inserted through the hole 16 of the body panel 12, the pawls 36 are elastically deformed while passing through the hole 16, and after clearing the hole 16 they elastically restore to their initial state and engage the undersurface of the body panel 12.

In the embodiment shown in FIG. 1, four pawls 36 extend radially outwardly from the opposite sides of the leg portion 32, so that they can reliably clamp the body panel 12 in cooperation with the flange portion 22. Body panels of larger thicknesses than that of the body panel 12 shown in FIG. 5 can also be clamped if the thickness falls between the lower surface of the flange portion 22 and the upper surface of the lowermost pair of pawls 36. The pawls 36 can also engage the flange portion 22, as shown in FIG. 3, when the inserting portion 24 is inserted through the opening 28 of the flange portion 22. In this case, as the inserting portion 24 is inserted through the opening 28 of the flange portion 22, the pawls 36 are elastically deformed while passing through the opening 28, and after clearing the opening 28 they elastically restore to their initial state and engage with the flange portion 22 so as to serve as a retainer to retain the inserting portion 24 in the inserted position with respect to insulator member 14.

A pair of arms 26 is provided upon each side of the center of the inserting portion 24. These arm pairs are inserted through the hole 18 of the insulator member, 14 from the back side thereof (that is the lower side in FIGS. 4 and 5). Upon the front side of the insulator member 14 (that is, the upper side thereof in FIGS. 4 and 5), the arms 26 of each pair are folded toward each other so that they extend substantially in the radially outward direction of the inserting portion 24 so as to tightly clamp the insulator member 14 in cooperation with the flange portion 22. These arms 26 couple the inserting portion 24 and flange portion 22 to each other such that the inserting portion 24 can be inserted through and taken out of the opening 28 of the flange portion 22.

More specifically, of the two arms 26 in each pair, one arm 26 has one end united by means of a reduced thickness portion 40 to a portion of the inserting portion 24 between the head 30 and the engagement portions 34 and the other end united by means of a reduced thickness portion 42 to one end of the other arm 26, which in turn has its other end united by means of a reduced thickness portion 44 to the flange portion 22 near the opening 28. The inserting portion 24 thus can be inserted into and taken out of the opening 28 of the flange portion 22 by causing elastic deformation of the reduced thickness portions 40, 42 and 44 in each arm pair and as a result of bending the arms 26 in each pair in opposite directions while causing an axial displacement of the arms. In their free state, the reduced thickness portions 40, 42 and 44 hold the two arms 26 in each pair such that they extend substantially in the longitudinal direction of the inserting portion 24, as shown in FIGS. 1 and 2. In this state, the arms 26 can be inserted together with the inserting portion 24 through the hole 18 of the insulator member 14 from the back side thereof. Furthermore, the arm 26 in each pair that is united to the inserting portion 24 is provided with a stopper portion 26a at its end which is coupled to the inserting portion 24. The stopper portion 26a is adapted to strike the outer periphery of the inserting portion 24 so as to prevent the swinging of the arms 26 away from the flange portion 22 (that is in the direction of arrow A in FIG. 5) beyond a predetermined extent. The arms 26 can thus reliably clamp the insulator member 14 in cooperation with the flange portion 22. The stopper portion 26a is adapted to strike the outer periphery of the inserting portion 24 during the insertion thereof through the opening 28 of the flange portion 22. After the stopper portion 26a strikes the outer periphery of the inserting portion 24, one of the arms 26 in each pair that is coupled to the flange portion 22 is bent radially outwardly so as to permit axial displacement of the inserting portion 24.

With the pawls 36 of the inserting portion 24 in engagement with the flange portion 22, the two arms 26 in each pair extend substantially in the radial direction of the inserting portion 24 so as to clamp the insulator member 14 in cooperation with the flange portion 22. In this case, the arms 26 urge the flange portion 22 against the pawls 36 as a result of the elastic force of the reduced thickness portions 40, 42 and 44, and they cooperate with the flange portion 22 to as to clamp the insulator member 14 therebetween.

Now, the procedure for member mounting the insulator member 14 upon the body panel 12 by means of the clip 10 according to the invention will be described.

First, with the inserting portion 24 disposed out of the opening 28 of the flange portion 22 as shown in FIGS. 1 and 2, the arms 26 are inserted together with the inserting portion 24 through the hole 18 of the insulator member 14 from the back side thereof.

Then, the moved back downwardly portion 24 is inserted through the opening 28 of the flange portion 22. The inserting portion 24 is advanced through the opening 28 of the flange portion 22 by causing elastic deformation of the reduced thickness portions 40, 42 and 44 so as to thereby cause bending of the arms 26 to a state in which the arms 26 extend substantially in the radial direction with respect to the inserting portion 24, while also causing elastic deformation of the pawls 36. The insertion is continued until the pawls 36 clear the opening 28 of the flange portion 22, and the extent of insertion is limited by means of the engagement portions 34.

When the inserting portion 24 is inserted up to the position noted above, the pawls 36 engage with the flange portion 22 so that they now act as a retainer so as to retain the inserting portion 24 in the inserted position. At the same time, the arms 26 which now extend in the radial direction with respect to the inserting portion 24 cooperate with the flange portion 22 so as to clamp the insulator member 14 therebetween (see FIG. 3). In this state, one of the arms 26 in each pair that is coupled to the inserting portion 24 is prevented by means of the stopper portion 26a from swinging away from the flange portion 22 beyond a predetermined extent 22, so that the insulator member 14 is reliably clamped, and the clip 10 will not be detached from the insulator member 14. In this state, the arms 26 urge the flange portion 22 against the pawls 36 as a result of the elastic force of the reduced thickness portions 40, 42 and 44 to as to clamp the insulator 14 in cooperation with the flange portion 22 with a slight gap being defined between the lowermost arm 26 and the upper surface of the insulator member 14.

Subsequently, the inserting portion 24 is inserted from the free end of the leg portion 32 through the hole 16 of the body panel 12. The inserting portion 24 is inserted through the hole 16 of the body panel 12 by causing elastic deformation of the pawls 36. This insertion is continued until the pawls 36 clear the hole 16. When the pawls 36 clear the hole 16, they engage the undersurface of the body panel 12 so as to clamp the same in cooperation with the flange portion 22. The inserting portion 24 is inserted still further through the opening 28 of the flange portion 22, whereby the insulator member 14 is tightly clamped between the arms 26 and the flange portion 22 (see FIGS. 4 and 5).

In this way, the insulator member 4 is mounted upon the body panel 12 as shown in FIGS. 4 and 5.

As has been shown, the clip according to the invention can be provisionally secured to the insulator member 14, so that it is possible to easily mount the insulator member 14 upon the body panel 12 without necessarily holding the insulator member 14 aligned with respect to the body panel 12.

Particularly, the invention is effective when the insulator member 14 is to be mounted on the lower surface of the body panel 12 or upon an upright body panel 12.

As has been described in the foregoing, the clip according to the invention for securing a first member to a second member, which comprises a flange portion having an opening, an inserting portion to be inserted first through the first member, then through the opening of the flange portion and then through the second member, a pawl portion provided upon the inserting portion and capable of engagement with the flange portion and also with the second member after the insertion of the inserting member through the opening of the flange portion, the pawl portion acting, when in engagement with the flange portion, as a retainer for retaining the inserting portion secured upon the first member and also acting, when in engagement with the second member, to clamp the second member in cooperation with the flange portion, and a plurality of coupling portions foldably united to the inserting portion and also to the flange portion and which are adapted to be inserted together with the inserting portion through the first member the coupling portion are bent into a folded state so as to clamp the first member in cooperation with the flange portion as a result of the pawl portion being in engagement with the flange portion or with the second member, has an excellent effect in that it can be provisionally secured to the first member.

What is claimed is:

1. A clip for clampingly supporting a first member, comprising:
   a flange portion having a first surface for engaging a first surface of a first member, having aperture means defined therein, to be supported upon said clip;
   aperture means defined within said flange portion and defining a longitudinal axis for said clip;
   axially collapsible, radially expansible, coupling means, fixedly secured at one end thereof to said first surface of said flange portion, for achieving two different states in order to support said first member upon said clip, a first one of said two different states being defined by said coupling means extending substantially axially in the direction of said longitudinal axis of said clip, and having a first axial extent, so as to be capable of insertion through said aperture means defined within said first member to be supported upon said clip, and a second one of said two different states being defined by said coupling means being axially collapsed with respect to said flange portion, and having a second axial extent which is less than said first axial extent, and being expanded radially outwardly so as to thereby engage a second surface of said first member to be supported upon said clip whereby said axially collapsible, radially expansible coupling means cooperate with said flange portion to clampingly support said first member therebetween;
   insertion means, fixedly secured at one end thereof to a second end of said axially collapsible, radially expansible coupling means, for axial movement in a predetermined direction through said aperture means of said flange portion so as to axially collapse and radially expand said axially collapsible, radially expansible coupling means from said first one of said two different states to said second one of said two different states;
   locking means fixedly disposed upon a second end of said insertion means for lockingly engaging a second surface of said flange portion so as to retain said axially collapsible, radially expansible coupling means in said second one of said two different states when said insertion means has been moved through said aperture means of said flange portion in said predetermined direction and to a first predetermined extent; and
   means provided upon said insertion means between said first and second ends thereof for engaging said flange portion so as to limit said axial movement of said insertion means in said predetermined direction through said aperture means of said flange portion.

2. A clip as set forth in claim 1, wherein:
   said flange portion, said coupling means, and said insertion means comprise a one-piece plastic molding.

3. A clip as set forth in claim 1, wherein:
   said second end of said coupling means comprises a head portion having a diametrical extent which is less than the diametrical extent of said aperture means defined within said first member so as to permit insertion of said coupling means, and said head portion thereof, through said aperture means of said first member.

4. A clip as set forth in claim 3, wherein:
   said coupling means comprises a pair of arms fixedly connected at said one end thereof to said flange portion and at said second end thereof to said head portion.

5. A clip as set forth in claim 4, further comprising:
first hinge means interconnecting said one end of said arms to said flange portion, and second hinge means interconnecting said second end of said arms to be head portion.

6. A clip as set forth in claim 5, further comprising:
third hinge means defined at substantially intermediate portions of said arms so as to permit said arms to achieve said axially collapsible, radially expansible second one of said two different states.

7. A clip as set forth in claim 6, wherein:
each one of said pair of arms comprises upper and lower arm sections which are adapted to be folded together with respect to each other at said third hinge means so as to permit said pair of arms to achieve said axially collapsed, radially expanded state.

8. A clip as set forth in claim 3, wherein:
said insertion means is suspendingly supported from said head portion of said coupling means.

9. A clip as set forth in claim 1, wherein:
said engaging means comprise radially extending projections for engaging said first surface of said flange portion.

10. A clip as set forth in claim 1, wherein:
said locking means comprises flexible pawls.

11. A clip as set forth in claim 1, wherein:
said flange portion comprises a second surface for engaging a first surface of a second member, having aperture means defined therein, to be supported upon said clip; and
said locking means engage a second surface of said second member when said insertion means has been moved though said aperture means of said flange portion a second predetermined extent which is greater than said first predetermined extent.

12. A clip as set forth in claim 11, wherein:
said locking means comprises flexible pawls.

* * * * *